(12) United States Patent
Corbin

(10) Patent No.: US 7,169,212 B1
(45) Date of Patent: Jan. 30, 2007

(54) GAS SEPARATION PROCESS

(75) Inventor: David Richard Corbin, West Chester, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 898 days.

(21) Appl. No.: 10/343,304

(22) PCT Filed: Aug. 18, 2000

(86) PCT No.: PCT/US00/22869

§ 371 (c)(1),
(2), (4) Date: Jan. 28, 2003

(87) PCT Pub. No.: WO02/16028

PCT Pub. Date: Feb. 28, 2002

(51) Int. Cl.
*B01J 20/18* (2006.01)
*B01D 53/047* (2006.01)

(52) U.S. Cl. .............................. 95/96; 95/138; 95/902; 423/DIG. 31

(58) Field of Classification Search ............... 95/96, 95/138, 902; 423/700, 219, DIG. 31; 502/60, 502/400; 128/204.18
See application file for complete search history.

(56) References Cited

U.S. PATENT DOCUMENTS

| 3,904,738 | A |   | 9/1975  | Robson |
|-----------|---|---|---------|--------|
| 5,098,880 | A | * | 3/1992  | Gaffney et al. .............. 502/432 |
| 5,228,888 | A |   | 7/1993  | Gmelin et al. |
| 5,944,876 | A | * | 8/1999  | Corbin et al. ................. 95/116 |
| 6,488,741 | B2| * | 12/2002 | Olson .......................... 95/144 |

OTHER PUBLICATIONS

Johnson, Geoffrey M. et al., Flexibility and Cation Distribution upon Lithium Exchange of Aluminosilicate and Aluminogermanate Materials with the RHO Topology, Chem. Mater., 1999, 2780-2887, vol. 11, American Chemical Society, 1999.

* cited by examiner

Primary Examiner—Frank M. Lawrence

(57) ABSTRACT

This invention relates to gas separation processes using a Li-rho zeolite, in particular to an air separation process where the Li-rho zeolite is an oxygen selective adsorbent.

3 Claims, 3 Drawing Sheets

Nitrogen and Oxygen Sorption Curves for a Carbon Molecular Sieve

Nitrogen and Oxygen Sorption Curves for the Li-Rho of Example 1

Nitrogen and Oxygen Sorption Curves for the Li-Rho of Example 2

GAS SEPARATION PROCESS

FIELD OF THE INVENTION

This invention relates to gas separation processes using a Li-rho zeolite, in particular to an air separation process where the Li-rho zeolite is an oxygen selective adsorbent.

BACKGROUND OF THE INVENTION

The main method of production of nitrogen and oxygen, two of the largest volume chemicals, is by cryogenic distillation of air. During the past three decades, air separation systems based on selective adsorption of nitrogen or oxygen have been commercialized, especially for smaller volume uses. A commonly used adsorption method for producing nitrogen from air is pressure swing adsorption (PSA). The feed to this process is typically air but may be nitrogen enriched air. Typically, it is a two bed process operating with a fairly simple cycle, that includes pressurization, product withdrawal at high pressure, pressure equalization of the beds and depressurization. Other steps such as a product purge may be used. The total cycle time is on the order of minutes. The high pressure is typically 4 to 8 atmospheres and depressurization is typically to atmospheric pressure though vacuum could be employed.

Presently, the preferred adsorbents for carrying out PSA air separations are either zeolites or carbon molecular sieves. Typically, zeolites are used when enriched oxygen (about 95%) is desired, and carbon molecular sieves are used when enriched nitrogen (about 99.5%) is the desired gas.

Carbon molecular sieves (CMS) are practical for separating oxygen from nitrogen because the rate of adsorption of oxygen is higher than that of nitrogen in these materials, i.e., a kinetic separation is effected. The difference in adsorption rates is due to the difference in size of the nitrogen and oxygen molecules; 0.364 nm and 0.346 nm, respectively. However, at equilibrium carbon molecular sieves do not have significant selectivity for either oxygen or nitrogen. Because the size difference of the molecules is so small, the CMS pore structure must be fine tuned in order to efficiently separate $O_2$ and $N_2$ on the basis of differing diffusion rates. U.S. Pat. No. 5,447,557 discloses an improved process for air separation using an oxygen selective adsorbent comprising a carbon molecular sieve impregnated with an acidic species.

When using zeolites, an equilibrium separation of oxygen and nitrogen is typically observed. This results from the difference in the quadropole moment between nitrogen (0.31 $Å^3$) and oxygen (0.1 $Å^3$). The nitrogen interacts more strongly with zeolitic cations than oxygen. Typically, for these processes vacuum swing adsorption (VSA) methods are used. Lithium and calcium have been disclosed as exhibiting particularly strong affinities for nitrogen (see U.S. Pat. No. 5,417,957 and U.S. Pat. No. 5,454,857).

PSA air separation processes make use of relatively simple equipment and provide easy maintenance when compared to cryogenic processes. Some drawbacks of PSA processes are lower product recovery and higher energy consumption than the cryogenic processes. Also, the high cost of currently available adsorbents and the product variability are major problems. Thus, there is a need for processes utilizing better adsorbents.

SUMMARY OF THE INVENTION

This invention provides a process for separating oxygen from air comprising the steps of:
(1) pressurizing an adsorbent bed containing Li-rho zeolite;
(2) passing a pressurized air stream over the adsorbent bed;
(3) adsorbing oxygen from the pressurized air stream to produce a nitrogen enriched product stream;
(4) withdrawing the nitrogen enriched stream from the adsorbent bed; stopping the flow of the pressurized air stream;
(5) depressurizing the adsorbent bed (optionally equalizing pressure with another bed prior to depressurization); and optionally, purging the adsorbent bed with the nitrogen-enriched stream from step (4) at reduced pressure; and
(6) repeating steps 1 through 5 in a cyclic fashion.

DETAILED DESCRIPTION

Figure 1:
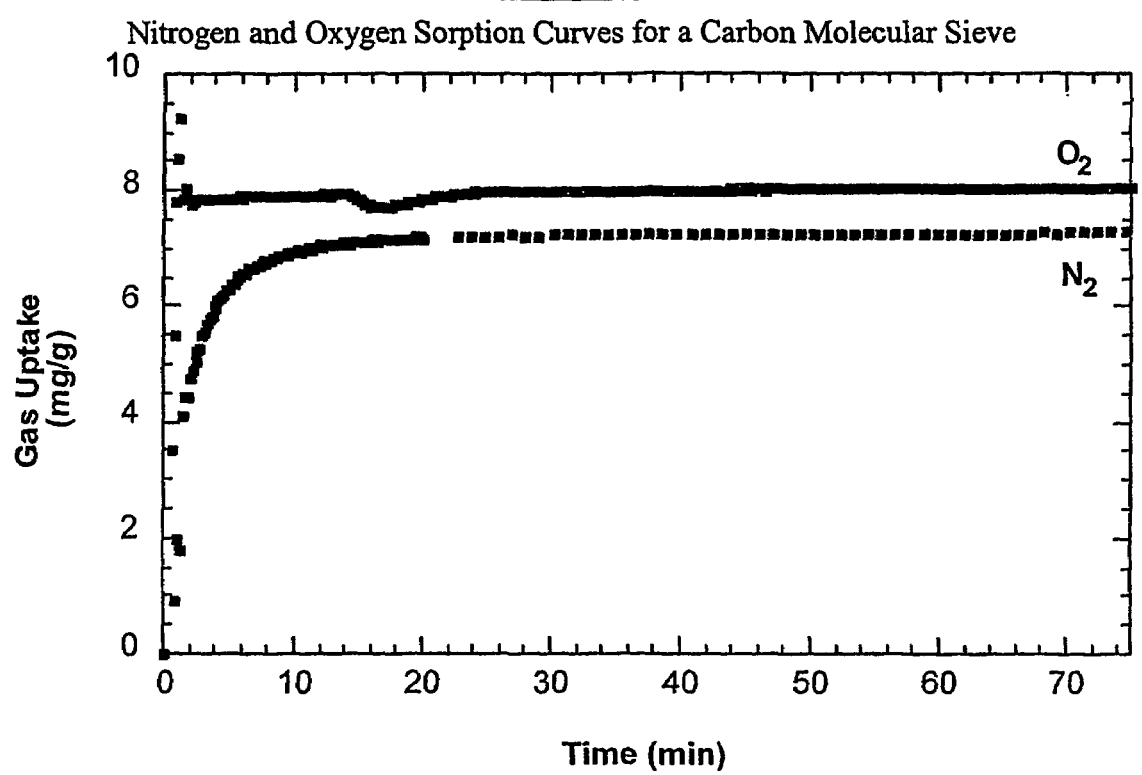
FIG. 1 shows the nitrogen and oxygen sorption curves for a carbon molecular sieve.

Zeolites can be generically described as complex aluminosilicates characterized by a three-dimensional framework structure enclosing cavities occupied by ions and water molecules, all of which can move with significant freedom within the zeolite matrix. In commercially useful zeolites, the water molecules can be removed from or replaced within the framework without destroying its geometry. Zeolites can be represented by the following formula: $M_{2/n}O \cdot Al_2O_3 \cdot xSiO_2 \cdot yH_2O$, wherein M is a cation of valence n, $\geq 2$, and y is a number determined by the porosity and the hydration state of the zeolite, generally from 2 to 8. In naturally-occurring zeolites, M is principally represented by Na, Ca, K, Mg and Ba in proportions usually reflecting their approximate geochemical abundance. The cations M are loosely bound to the structure and can frequently be completely or partially replaced with other cations by conventional ion exchange.

The zeolite structure consists of corner-linked tetrahedra with Al or Si atoms at centers of tetrahedra and oxygen atoms at corners. Such tetrahedra are combined in a well-defined repeating structure comprising various combinations of 4-, 6-, 8-, 10-, and 12-membered rings. The resulting framework consists of regular channels and cages, which impart a useful pore structure for catalysis. Pore dimensions are determined by the geometry of the aluminosilicate tetrahedra forming the zeolite channels or cages, with nominal openings of 0.26 nm for 6-rings, 0.40 nm for 8-rings, and 0.55 nm for 10-rings (these numbers assume ionic radii for oxygen). Pore dimensions are critical to the performance of these materials in catalytic and separation applications, since this characteristic determines whether reactant/adsorbent molecules can enter and product molecules (in the catalytic application case) can exit the zeolite framework. In practice, it has been observed that very slight decreases in ring dimensions can effectively hinder or block movement of particular reactants, adsorbates, or catalysis products within a zeolite structure.

The pore dimensions which control access to the interior of the zeolite are determined not only by the tetrahedra forming the pore opening, but also by the presence or absence of ions in or near the pore. In the case of zeolite A, for example, access can be restricted by monovalent ions, such as Na$^+$ or K$^+$, which are situated in or near 8-ring openings as well as 6-ring openings. Access is enhanced by divalent ions, such as Ca$^{2+}$, which are situated only in or near 6-rings. Thus, KA and NaA exhibit effective pore openings of about 0.3 nm and 0.4 ml respectively, whereas CaA has an effective pore opening of 0.5 nm.

Zeolite rho, the zeolite species employed in the process of the present invention, is a small-pore synthetic zeolite that in the as-synthesized form can be described by the formula: $(Na,Cs)_{12}Al_{12}Si_{36}O_{96} \cdot 44H_2O$. The structure and synthesis of this synthetic zeolite are described by Robson et al., "Synthesis and Crystal Structure of Zeolite Rho—A New Zeolite Related to Linde Type A", Advances in Chemistry Series 121 (American Chemical Society, 102–115, 1973), and by Robson, U.S. Pat. No. 3,904,738 (incorporated herein by reference). More recently a high silica rho has been disclosed by Chatelain, T., et al., "Synthesis and characterization of high-silica zeolite RHO prepared in the presence of 18-crown-6 ether as organic template", Microporous Materials, 1995. 4(2–3): p. 231–238. As noted above for the generic zeolite, the Na and Cs cations of zeolite rho can be partially or completely replaced by conventional ion exchange.

The framework of zeolite rho is composed of a body-centered cubic arrangement of truncated cubo-octahedra or α-cages linked by double 8-rings. Detailed structural characterization studies have shown the RHO framework to exhibit exceptional flexibility with particular sensitivity to cation, temperature, and degree of hydration. (See, "Flexibility of the Zeolite RHO Framework. In Situ X-Ray and Neutron Powder Structural Characterization of Divalent Cation-Exchanged Zeolite RHO," Corbin, D. R. et al., J. Am. Chem. Soc. 1990, 112(12), 4821–4830.) For examples D-exchanged rho shows the largest unit cell with a=15.0976 (4)Å (space group Im-3m) while Ca,D-rho shows the smallest reported unit cell for an aluminosilicate RHO structure with a=13.9645(7)Å (space group I-43m). This corresponds to a decrease in lattice volume of greater than 20% in going from D-rho to Ca,D-rho. This framework flexibility also leads to significant changes to the nature of the 8-ring pore. As the unit cell parameter changes from about 15.10 Å to about 13.96 Å the pore opening changes from essentially circular in nature to elliptical. For example, the pore opening in D-rho is about 5.1×5.1 Å compared to about 2.9×7.8 Å for Ca,D-rho (these numbers were determined from the structural data for the two forms and assume covalent radii (0.75 Å) for oxygen). These data represent the presently known extremes for the sizes of the largest pore opening of aluminosilicate rho resulting from framework flexibility alone (as opposed to the pore blockage described above for zeolite A). However, for most ion-exchanged forms at high levels of exchange, the cation is located in the 8-ring. This pore blockage prevents adsorbing molecules from ingress to and egress from the internal cages and pores of the zeolite rendering the material useless for many applications (except perhaps for gas encapsulation). However, it is possible that partial exchange of zeolite rho with H$^+$ (e.g., H,Cs-rho) will give at least some of the desired distortion and smaller pore size.

The known exceptions to this pore blockage at high levels of cation exchange are H-rho, Cd-rho (at a temperature of greater than about 300° C.) and Li-rho. Of special interest is Li-rho. Structural studies have shown the Li$^+$ cations site only in the 6-rings, well removed from the 8-rings this material. Recent work (see, "Flexibility and Cation Distribution Upon Lithium Exchange of AlSi- and AlGe-RHO Framework Materials.," Johnson, G. M., et al., submitted to Chem. Materials) has reported a cell edge of a=14.2610(3)Å for Li-rho of the composition, $Li_{7.6}Cs_{1.3}Na_{2.0}Al_{11.4}Si_{36.6}O_{96}$. This cation does significantly distort the rho framework such that the 8-ring pore opening is approximately 3.2×7.7 Å.

Na,Cs-rho as typically prepared, e.g., by the method of Robson, has a unit cell Cs content of less than 6. One such preparation, disclosed in the Corbin et al. reference described above, gave a unit cell composition of $Na_{7.1}Cs_{3.8}Al_{11.5}Si_{36.5}O_{96}$. Without wishing to be bound by theory, it is believed that the lower the unit cell Cs content the more effective the rho zeolite is for the separation of gases, particularly air. Other Li-rho zeolites which have been disclosed in the art have the following unit cell compositions; $Li_{4.8}Cs_{4.3}Na_{1.3}Al_{10.5}Si_{37.50}O_{96}$, $Li_{4.98}Cs_{0.08}Na_{0.021}(ND_4)_{5.64}Al_{11.9}Si_{36.1}O_{96}$, $Li_{7.6}Cs_{1.3}Na_{2.0}Al_{11.4}Si_{36.6}O_{96}$ and $Li_{9.3}Cs_{0.08}Na_{0.77}Al_{10.9}Si_{37.1}O_{96}$. All of these compositions can be used for the separation of gases, particularly air.

A useful application of the Li-rho zeolite is as an oxygen selective adsorbent in the separation of oxygen and nitrogen in a pressure swing adsorption (PSA) process, preferably a dual-bed PSA process. In the pressure swing method, air, preferably dry, at ambient temperatures and at pressures from about 100 kPa to about 1000 kPa is passed through a column containing a fixed bed that is packed with the zeolite Li-Rho. Oxygen is selectively adsorbed by the first packed bed at elevated pressure, producing a high-pressure product gas enriched in nitrogen. The pressure between the two beds is then equalized. The bed finishing adsorption is subsequently depressurized and the oxygen desorbed, usually with a purge taken from the product of the other bed, but optionally employing vacuum. The bed finishing desorption is then repressurized, and the cycle repeated. The two beds are run out of phase such that a continuous flow of product is available. The adsorbent may imbibe as much as about 0.3 mmole of oxygen per gram at atmospheric pressure.

The PSA methods described herein may be used for the large scale production of oxygen or nitrogen from air. The methods are also useful for removal of residual low levels of oxygen from nitrogen, argon and other gases.

Without further elaboration, it is believed that one skilled in the art can, using the description herein, utilize the present invention to its fullest extent. The following embodiments are to be construed as illustrative, and not as constraining the remainder of the disclosure in any way whatsoever.

EXAMPLES

Comparative Example A

Carbon Molecular Sieve

A sample of commercially available carbon molecular sieves (CMS) was placed into the experimental cell of a D-110 digital recording high pressure Cahn microbalance. The material was heated in the cell to 500° C. under vacuum (0.5–1 torr, (67–133 Pa)) and held at those conditions until the weight of the sample stabilized. The sample was then cooled to 50° C. and held at 50° C. until the weight stabilized. Nitrogen was allowed into the cell at a flow of 1000 cc/min until atmospheric pressure had been reached. The nitrogen flow was then reduced to 30 cc/min and the pressure was held at one atmosphere until the adsorption of nitrogen was completed (i.e., until the weight of the sample was stabilized). The flow of nitrogen was stopped and the cell was evacuated to 0.5–1 torr (67–133 Pa) and held under vacuum overnight to desorb the nitrogen from the sample.

Oxygen was allowed into the cell at a flow of 1000 cc/min until atmospheric pressure had been reached. The oxygen flow was then reduced to 30 cc/min and pressure was held at one atmosphere until the adsorption of oxygen was completed (i.e., until weight of the sample was stabilized). The flow of oxygen was stopped and the cell was purged with nitrogen for one hour for safety reasons.

The results are illustrated in FIG. 1 and clearly show CMS discriminates between oxygen and nitrogen.

Example 1

Li-rho

A 50 g sample of $NH_4$-rho, prepared by conventional ion exchange methods of Na,Cs-rho and synthesized by the method disclosed in U.S. Pat. No. 3,904,738, was contacted with a 10% solution of $NaNO_3$—(10 mL/g zeolite) three times for 1 hour each at 90° C. with filtering between each contact. The resulting material (30 g) was then contacted with a 10% solution of $NaNO_3$ three additional times for 1 hour each at 90° C. with filtering between each contact to give Na-rho. Chemical analysis by inductively chemical plasma (ICP) spectrometry gave a unit cell composition of $Si_{36.2}Al_{11.8}Na_{12.6}Cs_{0.36}O_{96}$ (with oxygen content assumed). A sample of Na-rho (20 g) was contacted with a 10% solution of $LiNO_3$ three times for 1 hour each at 90° C. with filtering between each contact to produce Li-rho. Chemical analysis by inductively coupled plasma (ICP) spectrometry gave a unit cell composition of $Si_{36.3}Al_{11.7}Na_{1.93}Li_{7.1}Cs_{0.3}O_{96}$ (with oxygen content assumed). The sample was then granulated by filling a 25 mm die with the Li-rho powder. The die was placed into a Preco Hydraulic Press Model PA7-1 which was then pressurized until the gauge indicated 25,000 pounds. The pressure was maintained 5 minutes and then released. The resulting pellet was removed from the die, crushed and screened to a −20/+40 mesh (−0.84 mm/+0.42 mm) powder.

A sample of the Li-rho was placed into the experimental cell of a D-110 digital recording high pressure Cahn microbalance. The material was dehydrated in the experimental cell by heating the cell to 500° C. under vacuum (0.5–1 torr, (67–133 Pa)) and holding at those conditions until the weight of the sample stabilized. The sample was then cooled to 50° C. and held at 50° C. until the weight stabilized. Nitrogen was allowed into the cell at a flow of 50 cc/min until atmospheric pressure had been reached. The nitrogen flow was then reduced to 30 cc/min and pressure was held at one atmosphere until the adsorption of nitrogen was completed (i.e., until weight of the sample was stabilized). The flow of nitrogen was stopped and the cell was evacuated to 0.5–1 torr (67–133 Pa) and held under vacuum overnight to desorb the nitrogen from the sample. Oxygen was allowed into the cell at a flow of 50 cc/min until atmospheric pressure had been reached. The oxygen flow was then reduced to 30 cc/min and pressure was held at one atmosphere until the adsorption of oxygen was completed (i.e., until weight of the sample was stabilized). The flow of oxygen was stopped and the cell was purged with nitrogen for one hour for safety reasons.

Figure 2:
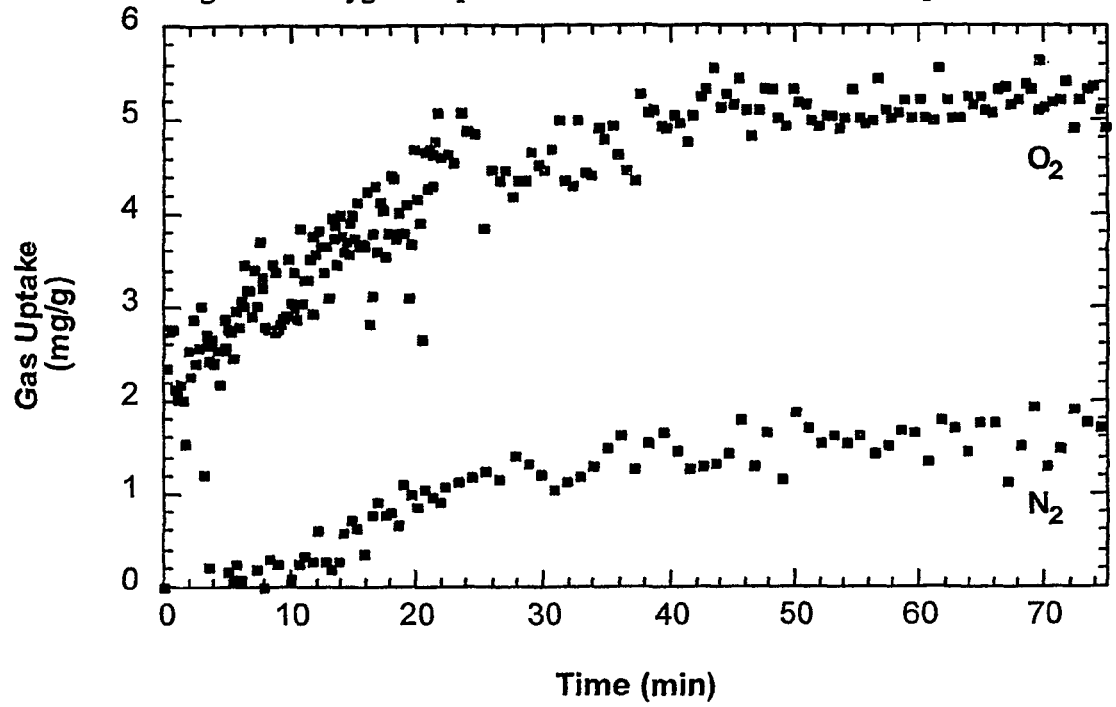
FIG. 2 shows the nitrogen and oxygen sorption curves for the Li-rho of Example 1.

The results are illustrated in FIG. 2 and clearly show Li-rho discriminates between oxygen and nitrogen.

Example 2

Li-rho

Li-rho (2 g) as prepared in Example 1 was calcined in air by heating 1° C./minute to 450° C. The sample was held 10 minutes at 450° C., heated 1° C./minute to 500° C., then held at 500° C. for 5 hours prior to cooling to 110° C. The dried sample was then transferred to a dry vial for transport.

A sample of the dried Li-rho was placed into the experimental cell of a D-110 digital recording high pressure Cahn microbalance. The material was dehydrated again in the experimental cell by heating the cell to 200° C. under vacuum (0.5–1 torr, (67–133 Pa)) and holding at those conditions until the weight of the sample stabilized. The sample was then cooled to 50° C. and held at 50° C. until the weight stabilized. Nitrogen was allowed into the cell at a flow of 50 cc/min until atmospheric pressure had been reached. The nitrogen flow was then reduced to 30 cc/min and pressure was held at one atmosphere until the adsorption of nitrogen was completed (i.e., until weight of the sample was stabilized). The flow of nitrogen was stopped and the cell was evacuated to 0.5–1 torr (67–133 Pa) and held under vacuum overnight to desorb the nitrogen from the sample. Oxygen was allowed into the cell at a flow of 50 cc/min until atmospheric pressure had been reached. The oxygen flow was then reduced to 30 cc/min and pressure was held at one atmosphere until the adsorption of oxygen was completed (i.e., until the weight of the sample was stabilized). The flow of oxygen was stopped and the cell was purged with nitrogen for one hour for safety reasons.

Figure 3:
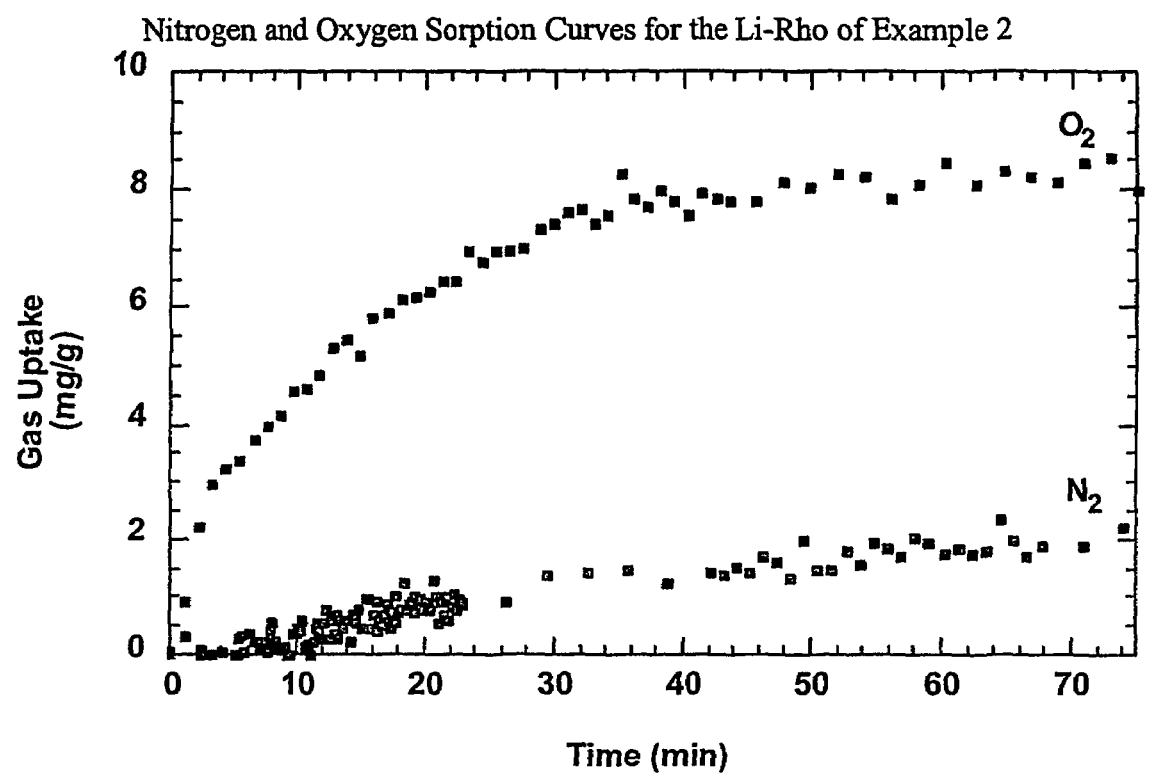
FIG. 3 shows the nitrogen and oxygen sorption curves for the Li-rho of Example 2.

The results are illustrated in FIG. 3 and clearly show Li-rho discriminates between oxygen and nitrogen.

The invention claimed is:

1. A process for separating oxygen from air comprising the steps of:
   (1) pressurizing an adsorbent bed containing Li-rho zeolite;
   (2) passing a pressurized air stream over the adsorbent bed;
   (3) adsorbing oxygen from the pressurized air stream to produce a nitrogen enriched stream;
   (4) withdrawing the nitrogen enriched stream from the adsorbent bed; stopping the flow of the pressurized air stream;
   (5) depressurizing the adsorbent bed; and optionally, purging the adsorbent bed with the nitrogen enriched stream from step (4); and
   (6) repeating steps 1 through 5 in a cyclic fashion.

2. The process of claim 1 wherein the Li-rho zeolite has a unit cell composition of $Si_{36.3}Al_{11.7}Na_{1.93}Li_{7.1}Cs_{0.3}O_{96}$.

3. The process of claim 1 wherein the Li-rho zeolite has a unit cell composition selected from the group consisting of $Li_{4.8}Cs_{4.3}Na_{1.3}Al_{10.5}Si_{37.5}O_{96}$, $Li_{4.98}Cs_{0.08}Na_{0.021}(ND_4)_{5.64}Al_{11.9}Si_{3.61}O_{96}$, $Li_{7.6}Cs_{1.3}Na_{2.0}Al_{11.4}Si_{36.6}O_{96}$ and $Li_{9.3}Cs_{0.08}Na_{0.77}Al_{10.9}Si_{37.1}O_{96}$.

* * * * *